Figure 4:
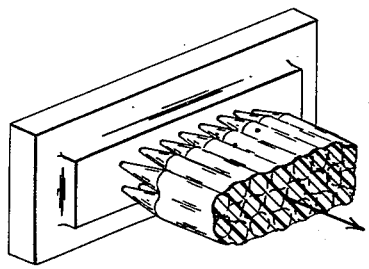

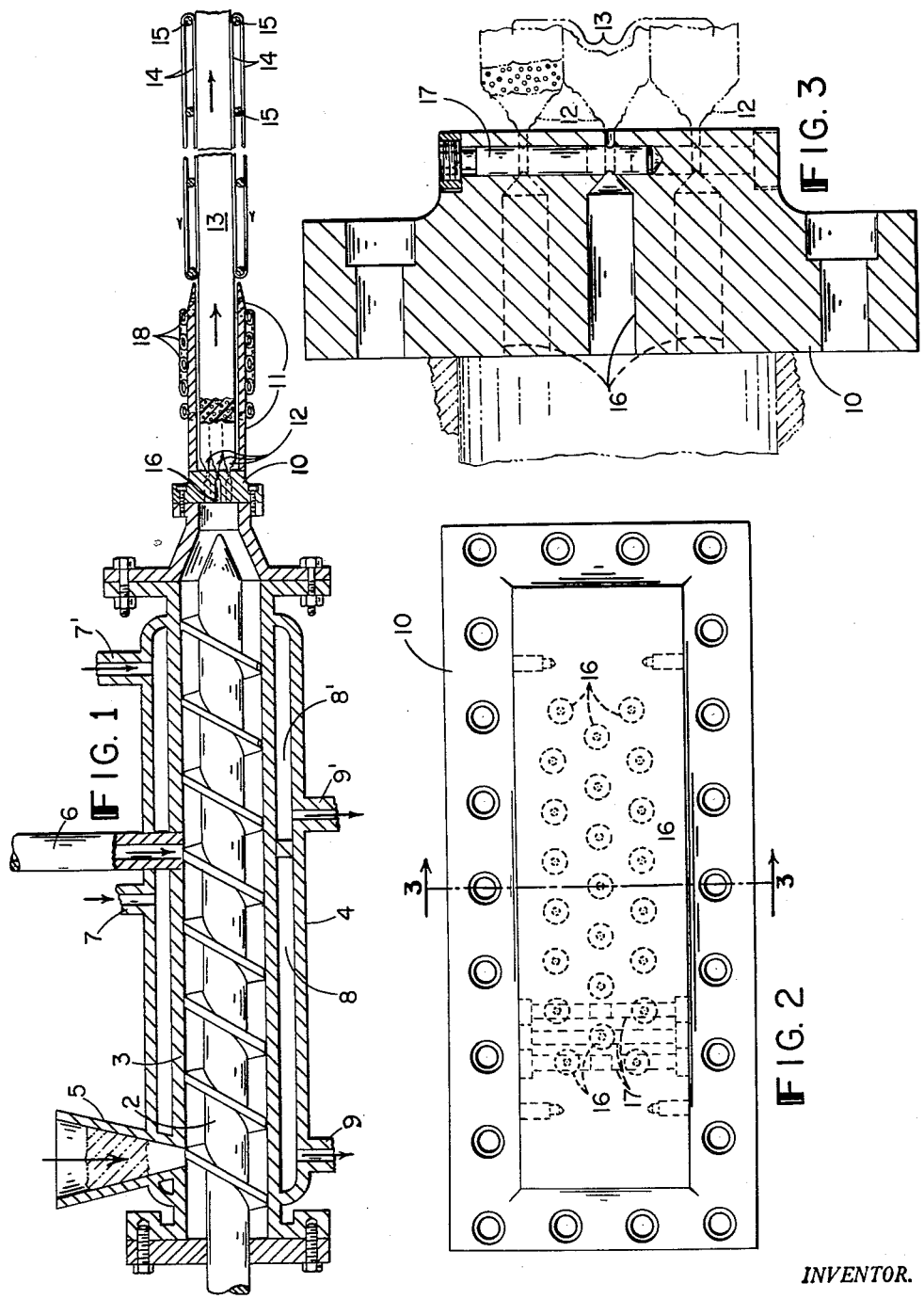

INVENTOR.
BY Leon R. Horne
ATTORNEY.

United States Patent Office 3,121,130
Patented Feb. 11, 1964

3,121,130
METHOD OF PRODUCING PLASTIC FOAM
Fred E. Wiley, Fred De Bell, and John M. De Bell, Longmeadow, Mass., assignors to Foster Grant Co., Inc., Leominster, Mass., a corporation of Delaware
Filed July 22, 1959, Ser. No. 828,862
8 Claims. (Cl. 264—53)

This invention relates to an improved process for the manufacture of cellular thermoplastic products. In particular, this invention is concerned with the continuous production of substantially uniform cellular bodies from thermoplastic, benzene-soluble polymers and copolymers of polymerizable aromatic compounds having a vinyl radical bonded to the carbon atom of the aromatic nucleus. More particularly, the invention is concerned with the production of such products from polystyrene and styrene copolymers.

Several methods of producing thermoplastic cellular bodies, more commonly known as plastic foams are now available. These processes are generally not adaptable to easy production of large or moderate sized cellular bodies continuously and economically at moderate or relatively low production rates in nominal size apparatus. Extrusion methods are now generally accepted as the most practical for production of foamed products. However, none of the known extrusion methods can be operated at low production rates in moderate size apparatus to produce products with a cross-sectional area large enough to be commercially desirable. Control of temperature and pressure and the rate at which they change is extremely important for the generation of good structures. If there is wide temperature variation over a cross section of the extrusion, uneven foam, coarse bubbles, variable gravity, uncertain strength and variable heat insulation may result. The temperature at expansion must be low enough to have the plastic viscous and solidifying so the small bubble structure is retained.

The prior art has adopted many expedients to meet these needs. For example, U.S. 2,577,743, which mixes polystyrene and blowing agent for hours and adds heavy soaps to adjust viscosity, discharges the mixture by batch process at the prodigious rate of 2,500 pounds an hour. If it were possible to operate such a process continuously, which is not contemplated by the patent, it would have to run at the enormous output of over 300 million board feet a year. The extrusion temperature of 100° C. does not allow much leeway in processing; and if the tremendous rate of extrusion is slowed, foaming would start back in the extruder. From the standpoint of economics and service over widespread markets, such a process is completely unattractive.

The process of U.S. Patent 2,450,436 is similarly restricted by several limitations. For example, the smallest linear dimension producible in this process must be at least two inches and must be extruded below the critical temperature of the blowing agent. Moreover, when the mass foams it must be cooled to a temperature not more than 10° above the heat distortion temperature of the polymer. Still another limitation is that the extrusion orifice must be an aperture of cross-sectional area corresponding to that of a circle of at least ¾ inch diameter. The process of U.S. Patent 2,669,751 similarly is limited by considerations that the foamable material must pass through the mixing and cooling zones solely by pressure of the feed with no forwarding motion of the agitator and must have a temperature of 266° F. or lower at the point of extrusion and in some cases 230° F. or lower.

In accordance with this invention, we found that it is possible to produce foamed cellular bodies in any practical size in conventional or small sized equipment and with complete freedom in choice of blowing or expanding agent including the cheapest available materials. In particular, it is possible by the present process to extrude desired shapes continuously and economically in conventional or small size equipment at controlled low production rates. As a result, the present process enables the construction of small plants at advantageously situated market centers thereby avoiding the large central plants and high shipping costs entailed in shipping large bulk, low weight materials. In addition, economies in process are realized by the use of the lowest cost blowing agents under conditions hereinafter described.

According to the invention, cellular thermoplastic products are produced continuously and economically by extruding a foamable material through multiple orifices into individual elements at such a temperature and in such proximity that they fuse or coalesce into novel, integral, strong, uniform, finished shapes. The ability to use small production units situated near points of utilization and the employment of cheap blowing agents and the avoidance of high extrusion rates required in the aforesaid processes give the present process unique, high commercial value.

In general, the objects of this invention are realized by extruding a foamable plastic material, i.e. polystyrene blended with an inexpensive blowing or expanding agent, through a multiple orifice die plate. The polystyrene may be pre-blended with such an agent and used in the form of foamable beads or may be blended with the agent during processing as hereinafter described and illustrated in the drawings. Upon release of the plastic material through the multiple orifices, individual foamed elements in strand form are produced mainly as a result of the pressure drop across each orifice. Due to the proximity of the individual foamed strands as they expand, they fuse or coalesce into an integral, strong, uniform shape. By placing a suitable former adjacent to the die plate, articles of any desired configuration can be produced in any length and cut as desired. Similarly, in the absence of a former, a log like article can be extruded. In still another embodiment, a die plate having many individually valved orifices can be used to give almost any desired shape or contour by the predetermined selective adjustment of orifices. By placing a former corresponding in shape to the geometric arrangement of the open orifices, profiles of considerable complexity of cross-section can be produced.

It has further been found that the ultimate cross-section of a foam has a relation to the orifice from which it originates. For example, it has been noted that some foamable compositions from a $\frac{1}{16}$" diameter orifice can expand to about $\frac{5}{8}$" diameter. Based on this, it would be expected that the use of a $\frac{1}{2}$" diameter orifice would yield at least a 5" diameter rod. However, this is not the case since it is found that such a large orifice will not maintain adequate pressure within the equipment unless the feed rate is greatly increased. While it is possible to use a reservoir for the foaming mixture and to release a large volume of material in a very short time through a larger orifice, thereby producing a log of desirable cross-section, such a reservoir is not commensurate with controlled, continuous operation. It is also seen that the multiple orifice concept upon which this invention is based leads to the important advantage of producing foams of a desired cross-section profile with little or no material waste. As a graphic illustration, use of multiple orifices in the manufacture of large slabs drastically reduces equipment size and capital requirements. Specifically, approximately 570 holes of $\frac{1}{16}$" diameter can be used in the present process at a production rate of 570 pounds per hour to produce a slab with 4" by 48" cross-section. Conversely, a rate of 75,000 pounds per hour through a slot 0.3" by 40" would be required to produce a similarly dimensional slab. The advantages in the use of multiple orifices over the single slit is thus obvious.

We have also found it expedient when extruding at high temperatures, and before appreciably cooling the foamed shape beyond the former, to employ one or more endless belts to remove the foamed article. As a result, the foamed article is kept straight and flat while cooling and a smoother surface is imparted thereto. Furthermore, by regulating the take off rate, sufficient back pressure can be transmitted to the point of foaming to insure coalescence of the individual strands.

Figure 5:
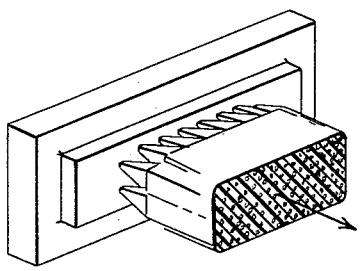
Figure 6:
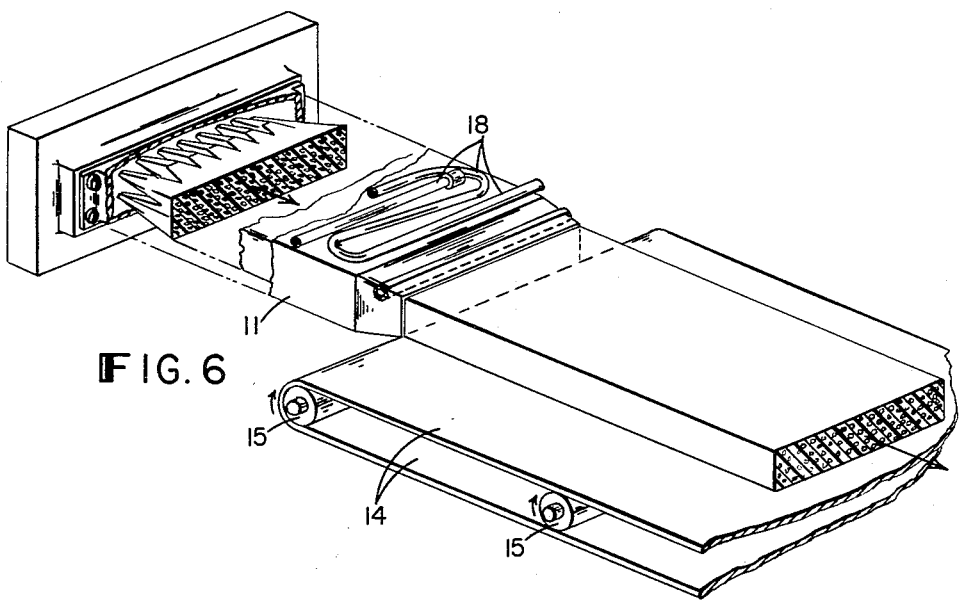

This invention will be more readily appreciated by reference to the drawings wherein FIGURE 1 is a side elevation in cross section illustrating a conventional screw extruder with multiple orificed die plate, with foaming elements issuing into a former and being removed between endless belts; and FIGURE 2 is a front elevational view of an orificed die plate having valve means; and FIGURE 3 is a side elevation in section taken along the line 3—3 of FIGURE 2; and FIGURE 4 is a perspective view of the multiple orificed die plate and individual foaming element issuing and swelling to coalesce into an integral shape; and FIGURE 5 is a perspective view of a square orificed die plate with foaming elements coalesceing in a forming box; and FIGURE 6 is a perspective view with detailed sections of a round orifice plate, a slab former, an endless belt, and a cross section of the extruded, expanded, coalesced, foamed product illustrating graphically the individual, coalesced elements.

In the drawing, the numeral 2 designates a feed screw in the cylindrical barrel 3 of a horizontal extrusion machine 4. Numerals 5 and 6 designate a polymer feed hopper and an expanding agent inlet, respectively. Jackets 8 and 8' function to control the extruder temperature and are provided with temperature control media inlet and outlet means 7 and 7' and 9 and 9' respectively. Multi-orificed die plate 10 is fastened to the forward or discharge end of the extruder. Former 11 is placed adjacent die plate 10 to receive and form the individual foamed elements 12 and is provided with temperature regulating means 18. Endless belts 14, driven by rolls 15, are arranged to remove the foamed product 13 as it leaves former 11.

Die plate 10, illustrated in larger detail in FIGURE 2, may be provided with orifices 16 and valve means 17, which valves by proper adjustment operate to control the desired back pressure as well as the size or configuration of the foamed product 13. Valves 17 are further illustrated in FIGURE 3.

FIGURE 4 illustrates extrusion directly into the atmosphere through a die plate having round orifices while FIGURE 5 illustrates extrusion through square holes into a former.

In producing cellular polystyrene by the present method, with reference to FIGURES 1 and 6, polystyrene is fed into extruder 4 through hopper 5 and mixed with an expanding agent fed through inlet 6. If foamable beads are used, inlet 6 is closed. The extruder is maintained at the required temperatures by means of heating or cooling media circulated through jackets 8 and 8' and the mix forwarded by motion of screw 2 towards die plate 10. Upon release of the mix through individual orifices 16, it expands as individual foamed elements or strands 12 which due to their proximity coalesce into an integral structure 13 as it passes through former 11. Former 11 may be provided with heating or cooling means 18 and conventional belts, shown as 14, may be used to remove the foamed product.

While a rectangular former is illustrated, any desired forming device may be employed. Similarly, although not shown, the former may be of a clamping type which clamps about the extruded form, travels with it until it cools, opens and returns for a fresh bite. In the absence of a belt, the foamed product may be discharged or drawn from the die plate and former in any usual manner, e.g. by hand or other mechanical means, and in some cases the foaming pressure itself will extrude or push the product from the die plate. Similarly, while the foamed product is illustrated as a slab, it is obvious that by proper adjustment of the valving means 17, whereby orifices 16 may be completely or partially closed, shapes of any desired configuration may be continuously extruded and subsequently cut into any desired length or thickness.

The amount of expanding agent employed depends upon the volume of gas it will generate and the foam density desired. In general, the weight percent of expanding agent, based on resin weight, will be in the range of 0.1 to 0.5 of its molecular weight, preferably about 0.25 of its molecular weight.

The blowing or expanding agents found suitable in the present process can be a gas which expands upon release of pressure to foam the plastic, a liquid which will vaporize to a gas and expand the plastic upon release of pressure, a solid which on decomposition releases a gas, i.e. an ammonium or azo type compound, or combinations of such gases, liquids, and solids. As examples of suitable normally gaseous agents there may be employed paraffins such as propane or butane or mixtures thereof, or cracked petroleum fractions. Similarly, olefins such as ethylene, propylene, butylene, etc., and mixtures thereof can be used to advantage. Suitable normally liquid blowing or expanding agents include methyl chloride, higher paraffins such as pentane, or hexane, freons, water, etc. In additions, more permanent gases such as carbon dioxide, nitrogen or air can be employed. Ammonium and azo type compounds useful in the process include ammonium carbonate, ammonium bicarbonate, potassium bicarbonate, diazoaminobenzene, diazoaminotoluene, azodicarbonamide, diazoisobutyronitrile, etc.

In comparison, the prior art has taught that it is necessary to employ only temperatures below the critical temperature of the blowing agent to produce plastic foams which limitation is not inherent in the process of the invention. For example, in the case of methyl chloride, a common blowing agent having a critical temperature of 290° F. and a critical pressure of 1000 p.s.i., it is obvious that a mixture with polystyrene at this temperature would have a very low viscosity and would not generate the required 1000 p.s.i. pressure drop required across any useful size orifice. It would be necessary, therefore, to use this material considerably below its critical temperature to produce a foam. However, it should be noted that this fact has no connection with the heat absorption created by phase change on depressurizing a hot liquid below its critical temperature. In contrast, propane has a critical temperature of about 208° F. at a pressure of about 620 p.s.i. Taking into consideration the poor solvent properties of propane in polystyrene, high viscosity would result at this low temperature and, for commercial rates, it would be necessary to produce foams above the critical temperature. While pressure also may vary within wide limits, preferred pressures are somewhat higher than the autogeneous pressure of the foamable mixture at operating temperature so as to insure homogeneity.

To further illustrate this invention, and not by way of limitation, the following examples are given.

*Example 1*

A mixture composed of 91 parts by weight of a molding grade polystyrene and 9 parts of propane was extruded under 1000 p.s.i.g. pressure and at a temperautre of 225° F. through a die plate containing 23 orifices each 1/16" in diameter into a rectangular former fastened to the die plate. A foamed board, 6" wide by 2" thick was produced at a continuous production rate of 27 pounds per hour. The product was a strong, uniform, integral finished structure of individually expanded, coalesced elements having a density of 2.1 pounds per cubic foot and was clear evidence of a novel and useful foamed product produced in small equipment at a continuous rate and well above the critical temperature of the propane expanding agent.

*Example 2*

Using the apparatus employed in Example 1 but with all 23 valved orifices being closed off approximately half to adjust the pressure precisely, a mixture composed of 89 parts by weight of a molding grade polystyrene and 11 parts by weight of butane was extruded under 650–700 p.s.i.g. pressure and at a temperature of 250–260° F. A foamed board having the dimensions of the product of Example 1 and a density of 1.7 pounds per cubic foot was produced at a continuous production rate of 27 pounds per hour.

*Example 3*

A mixture composed of 89.7 parts of weight of polystyrene and 10.3 parts by weight of a gas mixture containing 65% butane and 35% propane was continuously extruded through a die plate having 6 orifices each 1/16" in diameter and into a rectangular former fastened to the die plate. The pressure drop across the orifices was 700 p.s.i.g. and the temperature at the die was approximately 260° F. A foamed board having a density of 1.6 pounds per cubic foot was continuously formed at the rate of 10 pounds per hour.

The present process may be employed in the production of novel cellular products from solid thermoplastic benzene-soluble polymers and copolymers of monovinyl aromatic compounds such as monovinyl aromatic hydrocarbons of the benzene series having the vinyl radical bonded directly to a carbon atom of the aromatic nucleus and nuclear halogenated derivatives thereof. Among such monovinyl aromatic compounds are styrene, vinyltoluene, vinylxylene, ethylvinylbenzene, para-chlorostyrene, meta-chlorostyrene, para-isopropylstyrene, para-bromostyrene, and ethylvinyltoluene. Copolymers of any two or more of such monovinyl aromatic compounds may also be used. The method may also be used in producing cellular products from thermoplastic resins such as polymethylmethacrylate, and copolymers of methylmethacrylate and styrene, or copolymers of styrene and alpha-methylstyrene. The method is also applicable to graft polymers and to polymers with which have been compounded other modifying agents, i.e. polystyrene containing a small amount of rubber. It is likewise suitable for other hydrocarbons, such as polyethylene, polypropylene, polyisobutylene and their mixtures.

The process of the invention, as indicated above, is advantageously employed in the production of elongated cellular bodies, e.g. logs, planks, boards, etc. Most noteworthy is the avoidance of the narrow and critical operating conditions employed in the past. For example, in prior processes, use of a hydrocarbon blowing agent containing more than 4 carbon atoms requires foaming temperatures below the critical temperature of the blowing agent. No similar restriction is imposed by the present process on choice of temperature or blowing agent. Other prior conditions are dictated by the size of equipment used and the size of foam product desired. As a result, foams produced by a given process have characteristics with little possibility of variation. In sharp contrast, the present process because of the flexibility permitted in the use of blowing agents and removal of limitations on operating temperatures, pressures, and throughput rates, allows production of foam types with a wide variety of predetermined physical properties. For example, it is possible by the present process to produce a rigid, friable foam or a resilient shock proof, somewhat softer foam. Additionally, by proper control of operating temperatures and pressures a highly oriented foam can be produced. It is also possible by means of the present invention to produce a novel foam possessing a high degree of flexibility. The latter may be illustrated by the following example:

*Example 4*

Polystyrene containing a relatively high percentage of butane, in this case about 15% by weight, was extruded through the die plate employed in Example 2. The foam, having a density of 1.5 pounds per cubic foot, was allowed to cool and set before all of the blowing agent was spent. The cooled, set foam was then retreated at a low temperature in an atmospheric steam bath and it continued to expand slowly with the final release of blowing agent, its density dropping to 1.0 pound per cubic foot. Upon cooling, contraction of the gases caused the cell walls of the foam to partially collapse in a wrinkled, accordion fashion, and the initial density of 1.5 was attained. As a result, the microscopic folds in the cell walls impart high flexibility to the foam, quite unlike the usual rigid polystyrene foam.

While the foregoing examples illustrate the use of circular orifices, the invention is not limited thereto and includes within its scope the use of multi-orificed dies in which the orifices can have any single or combination of configurations such as slots, squares, holes, special shapes, etc.

Because of the small apertures which are used in the practice, this invention also offers a convenient means to make beads or structures which are incompletely foamed and which are subsequently expanded by heat. Thus, the strands may be extruded into a lower pressure zone which is nevertheless high enough to preclude full expansion, then may be cooled (which freezes the plastic) and broken by conventional methods into beads for subsequent foaming. The strands issuing from the dies may also be fed directly to molds in which they expand, to form foamed pieces of complex shape.

With regard to orifice size, satisfactory operation has been realized with orifice openings as small as .02" diameter and, accordingly, the lower limit of orifice size appears to be limited only by machining costs and practicability. Preferably, orifices 1/16" to 1/8" diameter with adjustable valves for flow regulation are employed. However, larger orifices, e.g. 3/4", can be used but the economic advantage of producing large shapes with moderate throughput diminishes rapidly with increase in orifice size.

In still another embodiment of this invention, foamed products of predetermined shape have been extruded and color decorated in predetermined areas simultaneously. Although it is, of course, possible to extrude a foamed product of one uniform color, it is not possible to obtain a multi-colored effect in the same manner. Multi-colored effects can now be obtained in foamed products using the process of this invention by metering dyes or pigments through the valve means to each strand as it is extruded. In this manner, various dyes or pigments are introduced into each strand as desired and a predetermined colored effect is obtained with little or no running together of colors. Individually colored foamed elements running longitudinally within the foamed structure at predetermined locations give predetermined axially continuous colors, and when cut transversely to a desired thickness gives finished, colored articles. To illustrate, colored products including Christmas decorations, toy animals, i.e. Easter bunnies, store and window display devices and the like are produced by this method.

The new and novel extruded foams produced by the process of this invention have unique properties. Whereas foams produced by the usual extrusion methods are not resilient and crush easily under the drop ball testing method, the present foams are highly resilient and resistant to crushing. Similarly, whereas a bead foam will pass moisture and vapor due to an incompletely fused structure the present foams possess the imperviousness of extruded foams. From these characteristics, it is obvious that the novel foams of this invention combine the desirable properties of both prior types of foams, namely resilience, resistance to crushing, and impermeability and eliminate the disadvantages of incomplete fusion, perability and brittleness. Most important is the ability to form predetermined shapes for the first time in nominal sized, low cost apparatus.

The novel products of this invention find a wide field of use. For example, these foams are being used as cold room, perimeter, concrete floor, annd tank truck insulation. In addition, the foams find use in boat construction, other buoyant applications and residential plaster base and industrial roofing insulation. The plain, colored and colorfully patterned foam also has application in packaging, floral and display uses, toys, novelties, etc.

The flexible foams, when sewed into clothing, give warmth and buoyancy, e.g. sports and military apparel. Industrially, the flexible foams are useful as insulating tape and wrapping for pipe lines.

We claim:

1. A method for the production of a substantially uniform finished thermoplastic cellular shape foam comprising forming a foamable composition by adding to a thermoplastic polymer at an elevated temperature and under pressure a foaming agent in an amount capable of expanding the polymer upon release of pressure and releasing said so-formed foamable composition to a lower pressure by passing simultaneously through multiple orifices at a temperature ranging from below to above the critical temperature of the foaming agent thereby expanding in such proximity that said foaming agent expands and foams the polymer into a multiple of expanded, coalesced polymer strands.

2. A method for the production of a substantially uniform finished thermoplastic cellular foam shape comprising forming a foamable composition by adding to a thermoplastic polymer at an elevated temperature and under pressure a foaming agent in an amount capable of foaming the polymer upon release of pressure and releasing said so-formed foamable composition to a lower pressure by passing simultaneously through multiple orifices at a temperature ranging from below to above the critical temperature of the foaming agent in such proximity that said foaming agent expands and foams the polymer into a substantially uniform integral knit cellular foam shape composed of a multiple of coalesced expanded polymer strands.

3. In a method for the production of a substantially uniform finished thermoplastic cellular foam shape from a mixture of a thermoplastic polymer and foaming agent, the step of extruding the mixture simultaneously from a pressurized area containing said mixture at a temperature ranging from below to above the critical temperature of the foaming agent into a lower pressure area through a plurality of orifices in such proximity that the foaming agent expands and foams the polymer to form coalesced individual elongated elements.

4. In a method for the production of a substantially uniform thermoplastic cellular foam of predetermined shape from a mixture of a thermoplastic polymer and foaming agent, the step of extruding the mixture simultaneously from a pressurized area containing the mixture at an elevated temperature into a lower pressure area through a plurality of orifices of a predetermined geometry at a temperature ranging from below to above the critical temperature of the foaming agent and in such proximity that the foaming agent expands and foams the polymer to form individual elongated foamed elements corresponding to said orifices and united and coalesced into a substantially uniform integrally knit cellular product during foaming.

5. In a method for the production of a substantially uniform thermoplastic cellular foam of predetermined shape from a mixture of a thermoplastic polymer and foaming agent, the step of extruding the mixture simultaneously from a pressurized area containing the mixture at a temperature ranging from below to above the critical temperature of the foaming agent into a lower pressure area through a plurality of orifices of a predetermined geometry and in such proximity that the foaming agent expands and foams the polymer to form individual elongated foamed elements corresponding to said orifices and united and coalesced into a substantially uniform integrally knit cellular product during foaming.

6. A method for the production of a colored, substantially uniform thermoplastic cellular foam of a predetermined longitudinal color distribution comprising forming a foamable composition by adding to a thermoplastic polymer at an elevated temperature and under pressure in a pressurized zone a foaming agent in an amount capable of expanding the polymer upon release of pressure, extruding the so-formed mixture from the pressurized zone at a temperature ranging from below to above the critical temperature of the foaming agent into a lower pressure zone through a plurality of orifices in such proximity that the foaming agent vaporizes and expands the polymer and simultaneously injecting a colorant through pre-selected orifices to color the element extruded therethrough to form individual, elongated, foamed strands corresponding to said extrusion orifices and united and coalesced into a predetermined colored, substantially uniform, integrally knit cellular product.

7. A method for the production of a substantially uniform flexible, thermoplastic cellular foam comprising forming a foamable composition by adding to a thermoplastic polymer at an elevated temperature and under pressure a foaming agent in an amount capable of expanding the polymer upon release of pressure, releasing said so-formed composition to a lower pressure by passing simultaneously through multiple orifices in such proximity at a temperature ranging from below to above the critical temperature of the foaming agent so that the foaming agent expands the polymer into a multiple of coalesced foamed polymer strands, cooling the foam prior to final expansion of said foaming agent, treating the foam in a steam bath, and cooling the foam thereby causing the cell walls to collapse partially to form a flexible, substantially uniform cellular foam.

8. A method for the production of a substantially uniform flexible thermoplastic cellular foam comprising forming a foamable composition by adding to a thermoplastic polymer at an elevated temperature and under pressure a foaming agent in an amount capable of expanding the polymer upon release of pressure, releasing said so-formed composition to a lower pressure by passing simultaneously through multiple orifices in such proximity at a temperature ranging from below to above the critical temperature of the foaming agent so that the foaming agent expands the polymer into a multiple of coalesced foamed strands, cooling the foam prior to final expansion of said foaming agent, treating the foam in a hot water bath, and cooling the foam thereby causing the cell walls to collapse partially to form a flexible, substantially uniform cellular foam.

References Cited in the file of this patent

UNITED STATES PATENTS

| | | |
|---|---|---|
| 2,091,124 | Stewart | Aug. 24, 1937 |
| 2,110,570 | Eichengrun | Mar. 8, 1938 |
| 2,149,425 | Draemann | Mar. 7, 1939 |
| 2,450,436 | McIntire | Oct. 5, 1948 |
| 2,501,690 | Prendergast | Mar. 28, 1950 |
| 2,537,977 | Dulmage | Jan. 16, 1951 |
| 2,676,927 | McCurdy et al. | Apr. 27, 1954 |
| 2,746,088 | Lindemann et al. | May 22, 1956 |
| 2,772,246 | Simon et al. | Nov. 27, 1956 |
| 2,795,008 | Lindemann et al. | June 11, 1957 |
| 2,818,905 | Simmonds et al. | Jan. 7, 1958 |

(Other references on following page)

UNITED STATES PATENTS

| | | |
|---|---|---|
| 2,857,625 | Carlson | Oct. 28, 1958 |
| 2,945,261 | Aukanian et al. | July 19, 1960 |
| 3,004,294 | Richard et al. | Oct. 17, 1961 |

OTHER REFERENCES

BASF booklet, "New Methods for the Fabrication of Styropor," by Dr. Ing. Fritz Stastny, all pp. and particularly page 24. (Reprinted from "Der Plastverarbeiter," 7,242–250 (1955).

Koppers booklet, "Dylite - Expandable - Polystyrene," 1954.